May 15, 1934.  S. G. HOOPER  1,958,789
ELECTRICAL SWITCH FOR AN ELECTROLYTIC WATER PURIFIER
Filed June 14, 1932
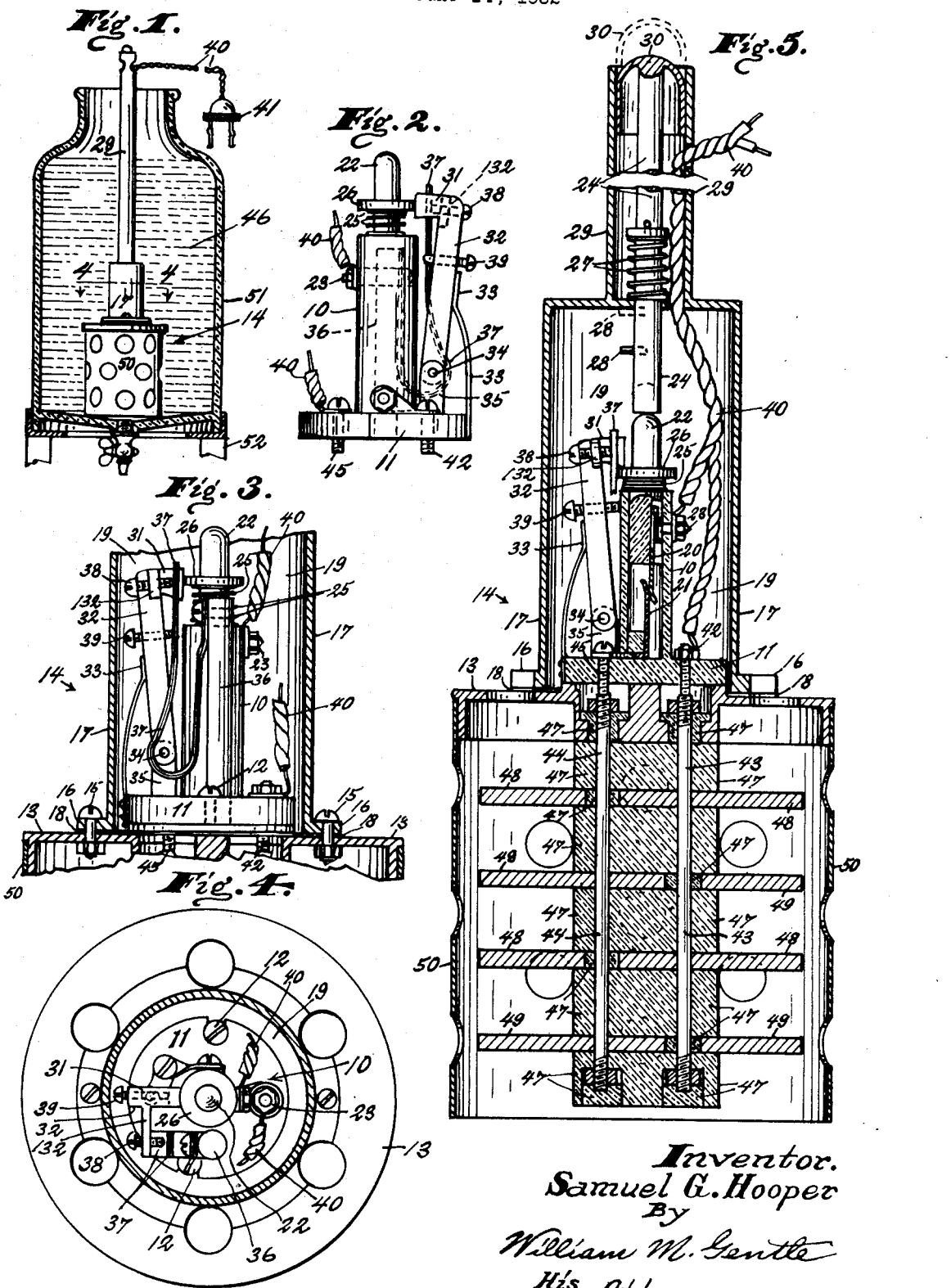
Inventor.
Samuel G. Hooper
By William M. Gentle
His Attorney.

Patented May 15, 1934

1,958,789

UNITED STATES PATENT OFFICE 1,958,789

ELECTRICAL SWITCH FOR AN ELECTROLYTIC WATER PURIFIER

Samuel G. Hooper, Beverly Hills, Calif.

Application June 14, 1932, Serial No. 617,163

2 Claims. (Cl. 200—138)

This invention relates to an improvement in electrolytic water purifiers and the principal object thereof is to provide such an apparatus with an electrical switch that can be submerged with the purifier without injury thereto, and that is also manually operable from above the water to turn on the current and that is automatically operated from within the water to turn off the current when the heat has reached a predetermined degree of temperature so as not to overheat the water or waste electricity. To that end I provide the water purifier with a relatively airtight chamber for enclosing the switch mechanism so it cannot be affected when the apparatus is submerged in the water, and extending out from the chamber and above the water line is a plunger for manually closing the switch so that the electrical current can pass through the apparatus and water, and within the chamber I provide a trigger and latch for holding the switch in a closed position until the heat has reached a predetermined degree of temperature. Within the chamber I also provide a thermostat arm for moving the trigger to open the switch to thereby prevent an over-heating of the water and waste of electricity.

A feature of invention is shown in arranging the switch in a watertight chamber so the switch mechanism will not be affected when the electrolytic water purifier is submerged.

Another feature of invention is shown in providing an enclosed electrical switch that is closed by manual means extending out of the enclosure for closing the switch and automatic means within the enclosure for holding the switch closed for a predetermined time and then releasing it so a spring can separate the contacts.

A further feature of invention is shown in the means for adjusting the trigger so that it will be moved to open the switch with great accuracy at any desired degree of temperature.

Other objects, advantages and features of invention may appear from the accompanying drawing, the subjoined detailed description and the appended claims.

The accompanying drawing illustrates the invention in which:

Figure 1 is a view of my water purifying apparatus in use showing it submerged in a water jar with the jar and a portion of its skeleton frame shown in section.

Fig. 2 is a side view of the insulated switch housing detached from its watertight casing showing the thermostat controlled trigger in a released position.

Fig. 3 is a view opposite to that shown in Fig. 2 arranged in its casing which is shown fragmentally and in section.

Fig. 4 is an enlarged cross section on line 4—4, Fig. 1, showing a plan view of the switch and associated parts.

Fig. 5 is a fragmental central vertical section through the apparatus showing the trigger of the switch mechanism in a set position, and also indicating by full and dotted lines that the manual means for engaging the switch contacts has been actuated.

The electrolytic switch for an electrolytic water purifier includes an insulated housing in the form of a hollow cylinder 10 having its lower end integral with a disk 11 that is adapted to be secured by screws 12 to the head 13 of the water purifier 14.

Also secured by screw 15 is a flange 16 of the casing 17 that extends down over the electric switch, and between the flange 16 and head 13 is a gasket 18 that excludes the water from the switch chamber 19.

The switch includes the movable member 20 and the fixed member 21 that are spring metal bars. The member 20 is secured to a slide 22 that is preferably formed of insulating material and this member is always in contact with the binding post 23 that extends through the wall of the cylinder 10, but is movable with the slide 22 so it can be moved into and out of contact with the switch member 21.

The upper end of the slide 22 is normally held in contact with the lower end of a plunger 24 by means of a spring 25 that is interposed between the upper end of the cylinder 10 and an annular collar 26 that is integral with the slide 22. Also the plunger 24 is forced upward by a spring 27 so that normally its stop pin 28 engages the top wall of the casing 17 as indicated by dotted lines in Fig. 5. In other words the plunger 24 is held elevated so that the slide 22 can be moved upward a sufficient distance to disengage the switch member 20 from the member 21 when the apparatus is not in operation or the circuit is open.

The plunger 24 is arranged in a tubular housing 29 and has a thumb piece 30 on its upper end that can be manually forced downward against the tension of the spring 27 to move the stem 22 and engage the contacts 20 and 21 with one another; and when so moved the slide 22 is held down by a latch 31 that is integral with the trigger 32.

Normally the face of the latch 31 contacts with the collar 26 that is integral with the slide 22, but when the slide 22 is forced downward the spring 33 forces the upper end of the trigger 32 toward the housing 10 so the latch engages the top surface of the collar and holds the slide 22 down so the switch members 20 and 21 are in contact, as best shown in Fig. 5. The trigger 32 is pivotally connected by a pin 34 to the stand 35 so it can be operated as above described.

The latch 31 is disengaged from the collar 26 by thermostatic means so that the switch members 20 and 21 are automatically disengaged when the temperature in the chamber 19 rises to a predetermined degree. This means includes a post 36 to which one end of the hair-pin arm 37 is secured and the other end of the arm is engaged with the inner end of an adjusting screw 38 that extends through a side extension 132 to the trigger 32, so that as the arm expands by heat it forces the upper end of the trigger away from the housing 10 and when the heat has reached a predetermined degree the arm will force the latch 31 off of the collar 26 and thereby permit the spring 25 to force the slide 22 upward to break the contact between the members 20 and 21.

I also provide an adjusting screw 39 that is extended through the trigger 32 that is arranged to engage the housing 10 and thereby limit the distance the latch 31 extends over the collar 26.

It is obvious that the screws 38 and 39 can be adjusted to very fully or lightly engage the latch with the collar and to cause a disengagement of these parts by a great or small expansion of the arm 37. In other words, the screws can be adjusted to cause a separation of the latch and collar either by a high or low temperature.

An electrical cord 40 having the usual wall plug 41 has one of its wires connected to the post or terminal 23 and the other wire is connected to the terminal 42 that extends down through the flange 16 into contact with the rod 43.

A corresponding rod 44 is in contact with the switch member 21 by a terminal 45 so that when the contacts 20 and 21 are engaged current will pass through the apparatus to heat and purify the water 46, as best illustrated in Fig. 1.

As shown in Fig. 5, the rods 43 and 44 are parallel and insulated from one another by blocks 47, but are in contact with their respective cathodes 48 and anodes 49 that are in the form of circular disks so that when in use the electrical current will have to pass through the water to complete the circuit.

The cathodes and anodes are enclosed in a perforated casing 50 through which water 46 can circulate when the purifier is submerged, as indicated in Fig. 1.

The resistance of the water to the electrical current causes the water to heat, and when the heat has reached a predetermined degree of temperature the switch is automatically opened as described.

If desired the water container 51 can be seated in a skeleton support 52 as fragmentally indicated in Fig. 1.

In operation the purifier is submerged in water and the plunger 24 is then actuated to move the contact 20 into engagement with the contact 21, whereby electric current can pass through the apparatus as described, and when the plunger is so actuated the trigger is actuated to move the latch over the collar 26 to hold the slide 22 down against the tension of the spring 25, and it is so held until the water is heated to a predetermined temperature.

The rising temperature causes the thermostatic arm 37 to expand as described to push the latch 31 off of the collar 26 so the spring 25 can expand and move the slide 22 to disengage the contacts 20 and 21, thereby automatically interrupting the flow of electrical current through the circuit.

I claim as my invention:

1. An electrical switch for an electrolytic water purifier that is adapted to be submerged in water, including a casing secured to said purifier having a watertight chamber therein, a hollow insulation housing secured in said chamber, a stationary electrical contact therein, a slide in said housing having an electrical contact thereon, manually operable means extending out of the chamber of said casing for moving said slide to engage its contact with said stationary contact, automatic means within the chamber of said casing for holding said slide so said contacts will be held temporarily engaged, and thermostatic means in the chamber of said casing for releasing said slide to separate said contact after the heat in said chamber has reached a predetermined degree of temperature.

2. An electrical switch for an electrolytic water purifier including a housing, a stationary and a movable contact in said housing arranged in an electrical circuit, a plunger for manually moving said movable contact into engagement with said stationary contact to close the circuit, a trigger, a latch on said trigger for detachably holding said contacts engaged, a thermostatic arm for moving said trigger to release said latch, a spring for disengaging said contacts when said latch is released, an extension to said trigger, an adjusting screw extending through said extension into contact with said arm, and another adjusting screw extending through said trigger to limit its movement toward said housing.

SAMUEL G. HOOPER.